United States Patent [19]

Samokovliski et al.

[11] 4,261,500
[45] Apr. 14, 1981

[54] MODULAR APPARATUS FOR THE FEEDING OF ELECTRODE WIRE THROUGH GREAT DISTANCES

[75] Inventors: David A. Samokovliski; Petko K. Grozdanov; Simeon G. Punchev; Alfred E. Nemechek; Steryu N. Dengubov, all of Sofia, Bulgaria

[73] Assignee: Institute Po Zovaryavane, Sofia, Bulgaria

[21] Appl. No.: 99,898

[22] Filed: Dec. 3, 1979

Related U.S. Application Data

[63] Continuation-in-part of Ser. No. 843,683, Oct. 19, 1977, which is a continuation-in-part of Ser. No. 726,280, Sep. 24, 1976, abandoned.

[30] Foreign Application Priority Data

Sep. 24, 1975 [BG] Bulgaria .................................. 33773

[51] Int. Cl.$^3$ .............................................. B65H 17/22
[52] U.S. Cl. ................................. 226/188; 254/134.6
[58] Field of Search ................. 226/108, 168, 181–188; 414/676; 254/134.6

[56] References Cited

U.S. PATENT DOCUMENTS

| 3,738,555 | 6/1973 | Karnes et al. | 226/168 |
| 3,746,232 | 7/1973 | Kirillov et al. | 226/187 |
| 3,901,425 | 8/1975 | Taylor et al. | 226/108 |
| 4,098,445 | 7/1978 | Samokovliski et al. | 226/186 |

Primary Examiner—Leonard D. Christian

[57] ABSTRACT

A multi-module system for advancing an electrode wire from a supply location to a field welding station via a plurality of spaced conduit sections is described. Each conduit section is succeeded and preceeded by a plurality of wire-advancing heads, with the front-most head adjacent the welding station being driven at constant speed and the remaining heads being driven at a variable tension. The tension in the variable-tension heads is initially set to advance the wire through the conduit sections in a continuous serpentine-like path. When the tension in the wire downstream of the forward-most head increases to impart a "straightening" component to the advancing wire, the forward-most head generates a control signal which is fed back via a regulator on the rear-most head to successively vary the tension in the successive rear heads in a successively decreasing manner corresponding to the decrease in total resistance of the wire tension seen by such successive heads. Such distribution of correcting force applied to the successive heads results in a rapid and effective restoration of the serpentine-like wire path through the system.

12 Claims, 14 Drawing Figures

MODULAR APPARATUS FOR THE FEEDING OF ELECTRODE WIRE THROUGH GREAT DISTANCES

This application is a continuation-in-part of application Ser. No. 843,683, filed Oct. 19, 1977, which in turn is a continuation-in-part of application Ser. No. 726,280, filed Sept. 24, 1976, now abandoned.

The invention relates to a modular apparatus for the feeding of electrode wire through great distances. The apparatus finds application in automatic and semi-automatic electric welding under plant and field conditions when the power sources of the electric current, shield gas, and the spool containing the electrode wire are at a considerable distance from the welding station.

A prior known device for the modular feeding of electrode wire through great distances is known as "POLISAPLAN"; in such device at the beginning and at the end of a hollow flexible hose there are disposed two wire feeding devices of the planetary type which interact. The first device, the pulling wire feeding device, also serves as a sensor of the mechanical resistance to travel of the electrode wire as a result of friction between the electrode wire and the flexible hose, while the operation of the rear device, the pushing wire feed device, is dependent on the front wire feeding device.

It is typical of this system that it operates with two individual electric blocks, mounted respectively on the pulling and the pushing wire feed devices. Speed control of the feeding of the electrode wire is effected by a potentiometer which varies the speed of revolution of the motor of the pulling wire feed device. The feedback between the motors of the pulling wire feeding device and the pushing wire feed devices is effected through a resistor mounted on the motor of the pushing wire feed device.

A system is also known for the feeding of electrode wire through great distances which works with more than two wire feed devices, e.g., three or four. This is the case of the so-called modular device for feeding through great distances, such as, for example, the "Linear" system. The interaction between the individual wire feeding modules of the "Linear" system is always effected with tensioned electrode wire in the hoses connecting the modules, which is one of the characteristic features of this system.

The electrode wire feed devices, as described above, have the following drawbacks:

The "POLISAPLAN" device operates with a limited number of wire feed devices, which necessarily limits the wire feeding distance. The provided feedback resistance, as well as the individual control blocks for each wire feed device or module increase the space required for the system and make it heavy.

The "Linear" system, operating with more than two wire feed modules, does not provide synchronization of the wire feeding speeds and interaction between the individual modules, which causes mechanical slippage of the electrode wire in the various wire feeding devices.

A system has also been known for feeding of welding wire through great distances, (U.S. Pat. No. 3,586,222), which has a plurality of direct current motors in tandem, one of which, the nearest one to the welding position, called the leading one, is provided with a falling characteristic of its speed. The remaining motors, called pushing motors, are subjected to the speed of the leading, pulling motor.

The system of speed control of the motors for even feeding of the wire in accordance with U.S. Pat. No. 3,586,222 includes:

1. a comparison between the control quantities representing the speed of the dragging moment of the motor for pulling and the predetermined desired feeding speed; and 2. A comparison between a pair of control signals indicating, respectively, the speed and the current demand of the pulling motor, etc.

Generally, the prior system for control discussed immediately above is a complicated one for assigning, comparison and regulation, and possesses the drawbacks of similar systems, in terms of complicated and difficult maintenance, and hence its low reliability. Such a system having a plurality of precise units and details, naturally, entails comparatively high production costs.

The object of the present invention is to provide a device for wire feeding through great distances by means of a multimodular feeding of the electrode wire, which features a simplified and inexpensive system of automatic interaction between the motors of the various modules, the securing of a smooth feeding of electrode wire to the welding puddle independent of the occurring momentary resistances in the movements of the wire in the hoses, and the securing of a reliable operation without mechanical slipping between the wire and the feeding means at any feeding speed.

This object has been achieved by the device of the invention for modular feeding of electrode wire through great distances, which includes a terminal pushing module, one or more intermediate pushing modules, and one regulating pulling module situated in proximity to the welding station. All of the modules are interconnected by means of flexible hoses, to provide the route along which the electrode wire is fed.

Each of the modules contains a wire feeding head of a planetary type and an electric motor housed in the module, while the shielding gas necessary for the carrying out of the welding process passes between the rotor and the stator of the electric motor to cool it.

All modules are current conductive for welding current and have outer insulation as well as inner insulation preventing short circuiting of the electric motor.

The modules have a common regulator, inbuilt in a common block, housed in the rear pushing module, or in the power source for the welding current.

The pulling module, situated closest to the welding station, is a device which has a closed system for automatic regulation, and consists of a regulator, a generator of ignition pulses, and a thyristor step. The system is able to maintain the assigned speed under variable loads. The remaining devices, modules situated along the hose, have only thyristors and generators of ignition pulses which are synchronized with the generator of ignition pulses of the first or pulling device, in such a way that the thyristors of all the devices are released simultaneously. The synchronization of the individual generators of ignition pulses can be achieved either by means of a special conduit, along which the synchronization pulses of the generator for ignition pulses of the first device travel, or by means of shapers of the cynchronization pulses in each successive device, after the first device, which follow the current demand of the first motor in one of the supply conduits and create a synchronization pulse at the beginning of each current pulse. These shapers can react to the voltage drop of one of the resistors connected in succession to one of the supply conduits, or to the pulses of the secondary side of a current transformer whose primary coil is connected in succession to one of the supply conduits. As the release phase of the thyristor in the regulator of the first device depends on the load, as well as on motor speed, a combined link is provided between the individual regulators in terms of current and speed. On the other hand, the operation of the motor under a regime of discontinued current causes falling characteristics of electric activation of the motors of the second and the successive mechanisms, which prevents mechanical slipping of the wire and, by means of varying the speed over or under the speed of the first motor, provide conditions for such alteration of the length of the electrode wire between the individual mechanisms, which makes the loads of the individual motors equal. After the loads have been made equal, there is a levelling off of the motor speeds as well, or if the modification of the wire feeding mechanisms require it, with operation at closely controlled speeds, for example, for compensation of an admissible tolerance in the speed reduction coefficient.

In accordance with a preferred embodiment, the motor of the pulling module has "hard" characteristics, and runs at a speed which is constant and independent of its mechanical load. The motors of the remaining modules have falling "soft" characteristics, that is, they drop in speed with increasing mechanical loads, and variable momentary speed, which can be different at a given moment for the individual pushing modules.

In certain cases it is necessary to make an additional correction in terms of the introduction of a small delay in the motors controlled by the synchronization pulses for the compensation of certain secondary factors, such as the difference in the diameters of the motors, various lengths of the supply cables, etc.

The absence of a closed system for the automatic regulation of the second and the successive feeding mechanisms leads to a steady, constant speed operation, the lowering of costs, and a higher reliability of control. These are mainly the advantages of the invention.

Other advantages include a smooth feeding of electrode wire to the welding puddle and the covering of great distances, with a reduced number of intermediate modules, owing to the snakelike manner of pushing the electrode wire through the hoses.

The use of the planetary wire-feeding head of the pulling module as a sensor for the mechanical resistance to travel of the wire considerably simplifies the system for regulation and control thus making its reliability higher.

Apart from that, due to its hard characteristics, the pulling module ensures an even feeding of the wire in the proximity of the welding arc.

A preferred embodiment of the invention is shown in the attached drawings, in which.

In FIGS. 1–4, inclusive, the speeds of the motors of modules 1, 2, 3, and 4 are designated, respectively, as $W_1$, $W_2$, $W_3$ and $W_4$, and the current demands of such motors are designated, respectively, $I_1$, $I_2$, $I_3$, and $I_4$.

Figure 1:
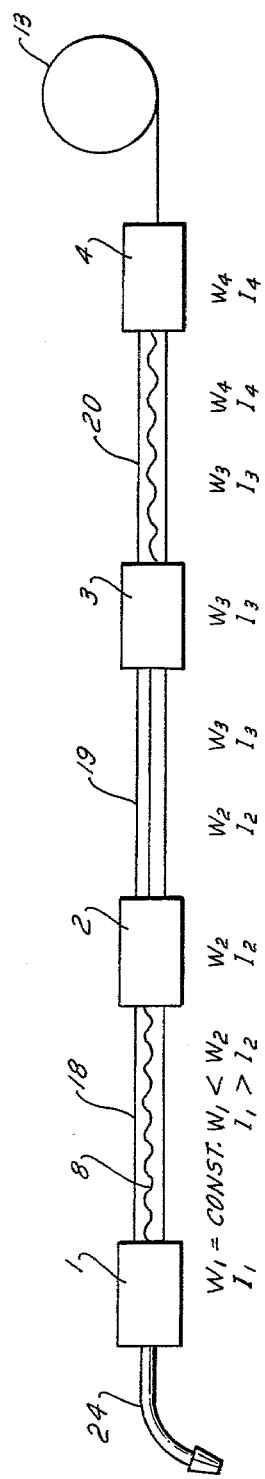
FIG. 1 is a diagram showing the operation of the device with the pulling module being without load, such figure showing the snake-like feeding of the electrode wire through the hoses between the modules.
Figure 2:
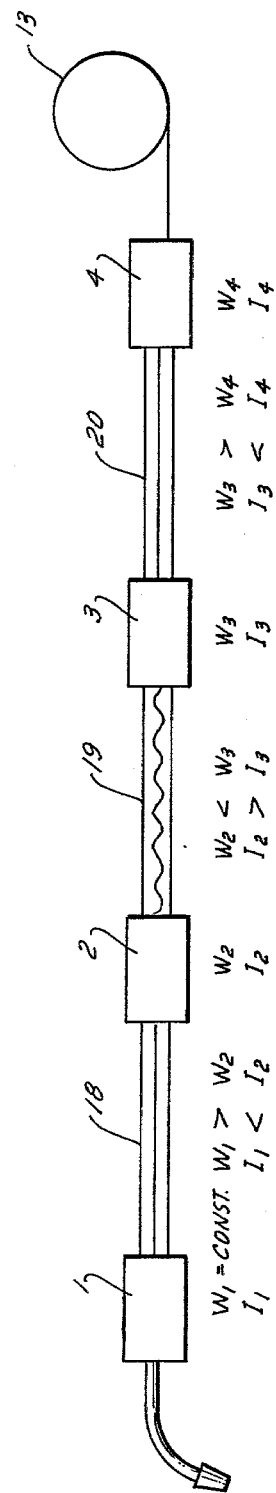
FIG. 2 is a diagram showing the operation of the pulling module under load.
Figure 3:
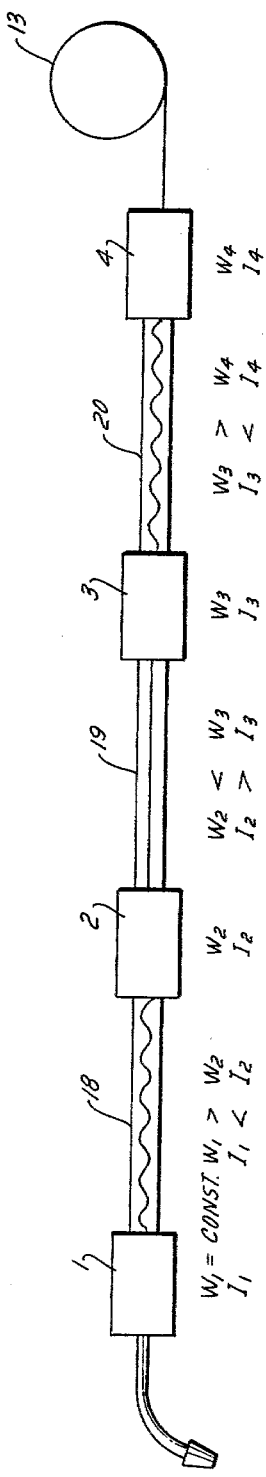
FIG. 3 is a diagram showing the operation of the device when the pulling module has resumed the motion and the load of FIG. 1.
Figure 4:
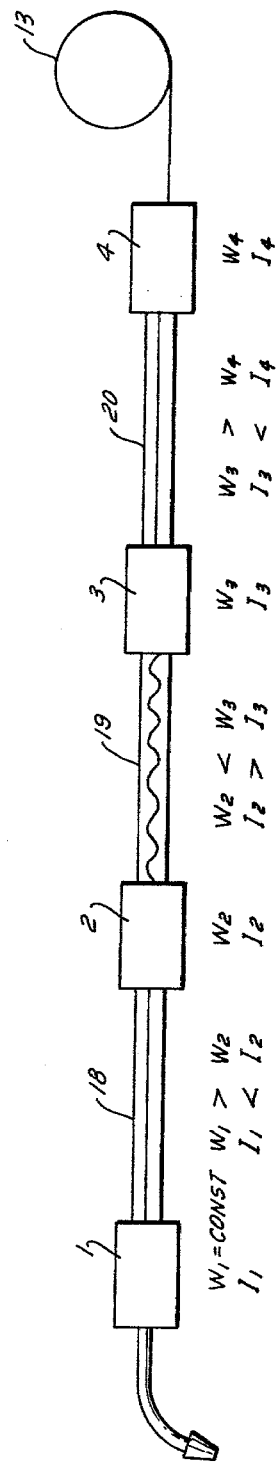
FIG. 4 is a diagram showing the operation of the device when the motion of FIG. 2 is resumed.

As shown in FIGS. 1, 2, and 3, in the illustrated embodiment, the device for modular feed of electrode wire contains four modules—1, 2, 3, and 4, of a planetary type, each having independent motion provided by its own motor, the modules being interconnected by a mechanical link constituted by the electrode wire 8, and by flexible hoses 18, 19 and 20, through which the electrode wire passes. The first module 1, built into the grip of the device, is the so-called pulling module, performing the part of a leading module.

The last module 4, being closest to a spool 13 containing the electrode wire 8, is a terminal pushing module, and is connected to the rear end of the hose 20. Between the pulling module 1 and the pushing module 4, two intermediate modules 2 and 3 are disposed, the first of the intermediate modules, 2, being connected with the ends of the hoses 18 and 19, and the other intermediate module, 3, being connected with the other end of the hoses 19 and 20. As a matter of fact, the intermediate modules 2 and 3 and the last or rear module 4 are pushing modules.

The electric motors of all modules 1, 2, 3, and 4 are direct current operated and are connected between each other and with the pulling module 1 by means of two common supply conduits 10 and 11 and with a synchronization conduit 9.

Figure 5:
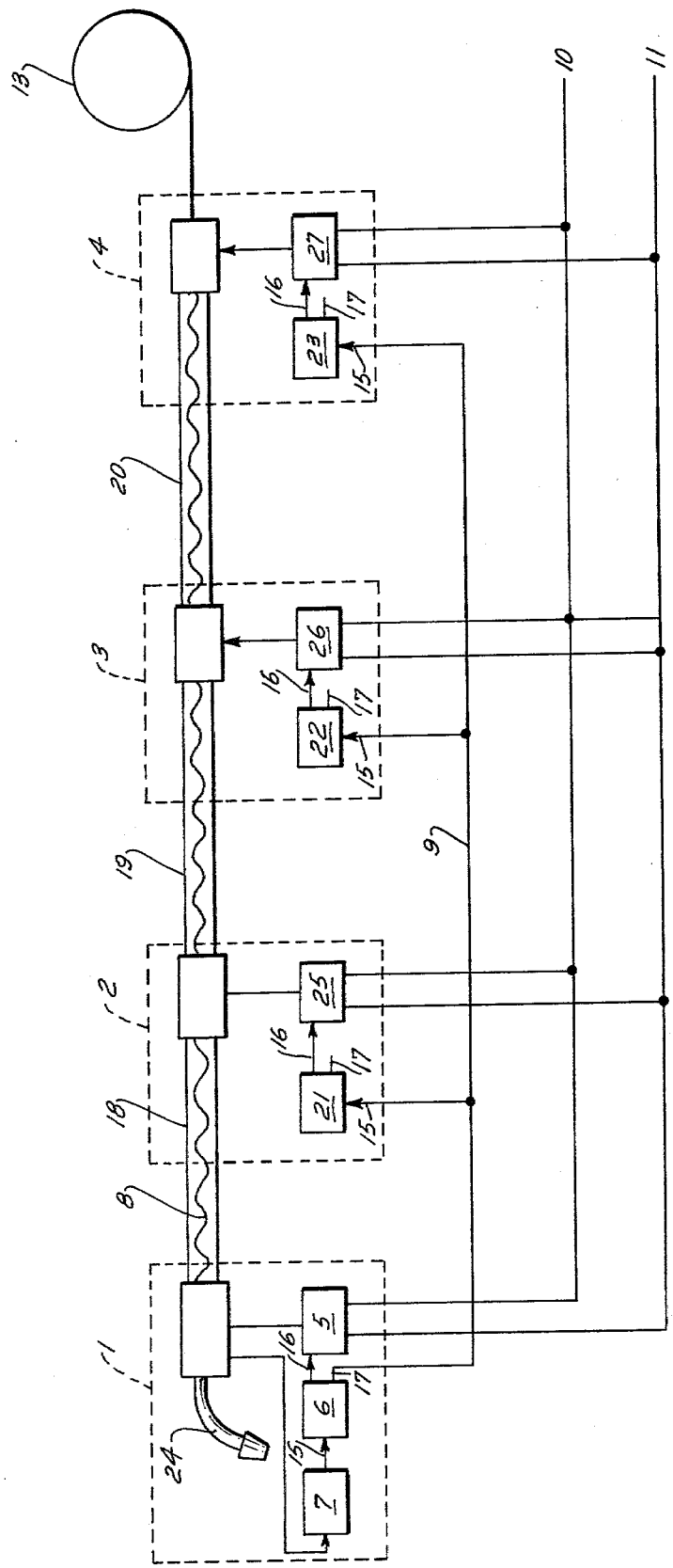
FIG. 5 is a diagram of the device having four wire feeding devices in tandem, with a special circuit means for synchronization.
Figure 6:
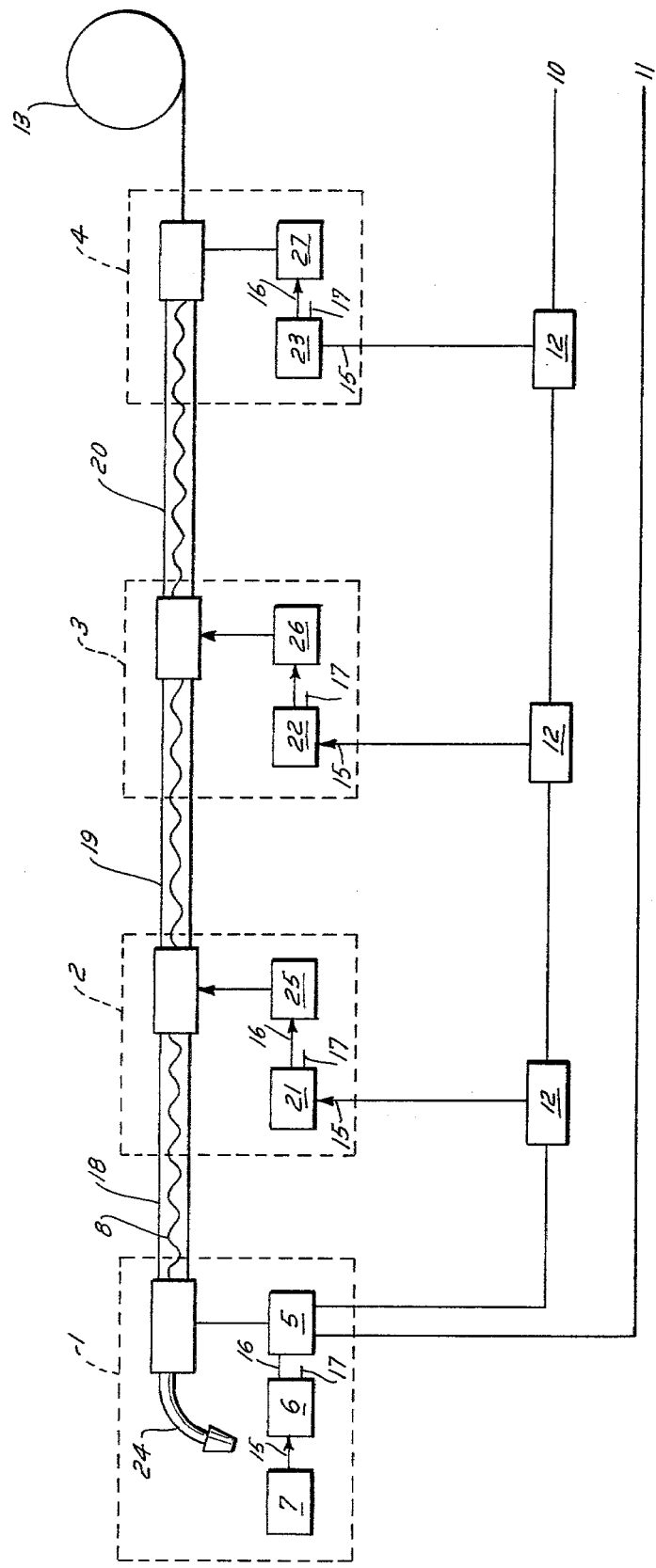
FIG. 6 is a diagram of the device having four wire feeding devices in tandem with synchronization of the thyristor steps after the beginning of the current pulses of the first motor.

As is evident from the drawings, the first wire feeding device 1, which is a pulling wire feeding device, is connected with the successive wire feeding devices 2, 3, and 4 by means of the electrode wire 8, in the sense of a mechanical link, which is fed from the spool 13, and two electrical electrical conduits 10 and 11, which are in fact the supply conduits. The modules are also linked by the synchronization conduit 9 as well. Each wire feeding device 1, 2, 3, and 4, contains in addition to the described planetary wire feeding mechanism, a thyristor step 5, 25, 26, and 27, respectively, and a generator of ignition pulses 6, 21, 22, and 23, respectively. Each generator has an input 15, in which the synchronization pulses are received, and an output 16 from which the ignition pulses issue. Another output 17 for the synchronization pulses is provided in the first wire feeding module 1, as shown in FIG. 5. The first wire feeding device 1 contains a speed stabilizer 7, the input of which is linked with the wire feeding mechanism 1, which its output is linked with the input 15 of the ignition pulse generator 6. The output 16 of the ignition pulse generator 6 of the each wire feeding device 1, 2, 3, and 4 is linked with the thyristor step 5, and the latter, which is linked with the wire feeding mechanisms 1, 2, 3, and 4, is used as a power supply for the motors. The inputs 15 of the ignition pulses generators 21, 22, 23 of the second and each successive wire feeding devices are linked by means of the synchronization conduit 9 with the synchronizing output 17 of the ignition pulse generator 6 of the first wire feeding device 1 (FIG. 5) or with the output of the synchronization pulse shaper 12, through which one of the supply conduits 10 and 11 passes (FIG. 6).

The speed of the wire feeding mechanism of the first wire feeding device 1 as well as the speed of the electrode wire at the welding station are stabilized by the speed stabilizer 7 in device 1. By means of the synchronization conduit 9 or the supply conduit 10 or 11 and the synchronization pulse shaper 12 all ignition pulse generators 21, 22 and 23 of wire feeding modules 2, 3, and 4 are activated simultaneously, all produce ignition pulses, and all simultaneously release the thyristors of the thyristor stages 5, 25, 26, and 27. The motors have such an electrical time constant, that they operate under the regime of make-and-break current. This, as well as the absence of speed stabilizers in modules 2, 3, and 4, secures the falling characteristics of their respective motors upon an increase in their mechanical load.

Figure 12:
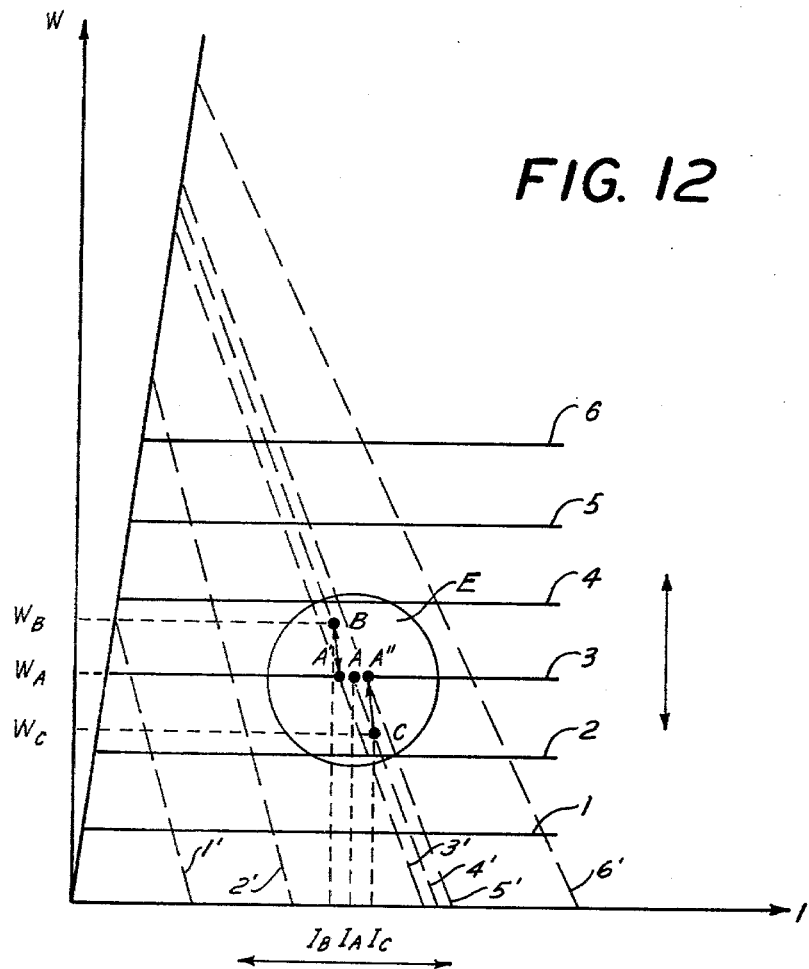
FIG. 12 is a graph wherein the speed of the motor of the first or pulling module is plotted against the current fed to such motor.
Figure 12A:
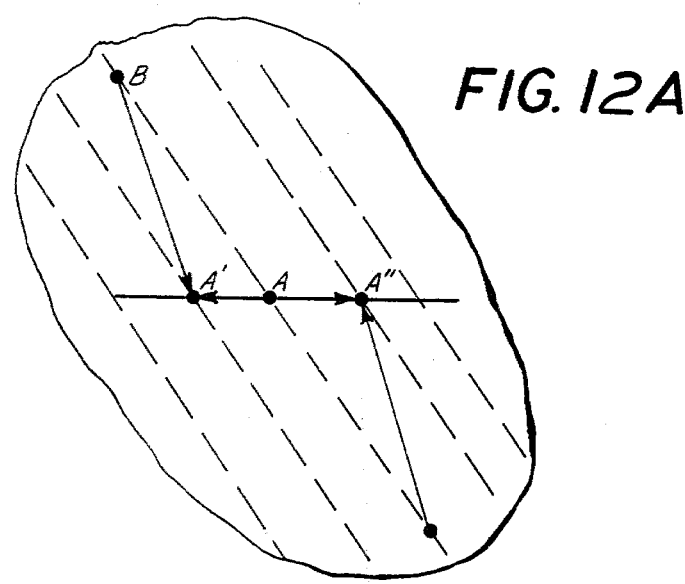
FIG. 12A shows a fragment E of the graph of FIG. 12 on an enlarged scale.

FIGS. 12 and 12A in full horizontal lines, 1, 2, 3, 4, 5, and 6, show in an idealized manner the hard characteristics of the first wire feeding device 1, while the dotted lines, 1', 2', 3', 4', 5' and 6', show the falling characteristics of the motors of the second and the successive wire feeding devices 2, 3 and 4. Suppose the assigned spped of module 1 is WA. Then the operation point A of the first wire feeding device 1 will be situated somewhere along the horizontal line having the ordinate WA. Supposing the first wire feeding device 1 has tensioned most of the wire between itself and the second wire feeding device 2 (FIG. 2). Then the latter is less loaded and the operation point B of its motor is located on that line passing through point A. Its speed is higher and it gradually starts exerting a pushing effort upon a still greater part of the wire (FIGS. 1 and 3), in its front and in this way it is loaded still more and unloads the first wire feeding device 1, until both modules 1 and 2 stop at operation point A', where they are loaded equally. On the contrary, if the second wire feeding device 2 is loaded more than the first module 1 and its operation point is C, the module 2 runs at a lower speed, and the first wire feeding device 1, running at greater speed, pulls a still greater part of the wire between itself and the second wire thus assuming more of the load and unload the second wire feeding device 2, until both reach operation point $A^4$. The action of the successive wire feeding devices is similar, modules 3 and 4 having the same characteristics as the second wire feeding device 2.

The mode of action of the system:

We first review the system considering combination of two individual modules which interact, modules 1 and 2, modules 2 and 3, modules 3 and 4, etc. In this case, module 1 is the pulling one in relation to module 2, module 2 is the pulling one in relation to module 3, and module 3 is the pulling one in relation to module 4. To the contrary, module 2 is the pushing one in relation to module 1, module 3 is the pushing one in relation to module 2 and module 4 is the pushing one in relation to module 3; the only pulling module in the system is module 1 and the only pushing one is module 4. Modules 2 and 3 are both pushing and pulling modules.

Figure 13:
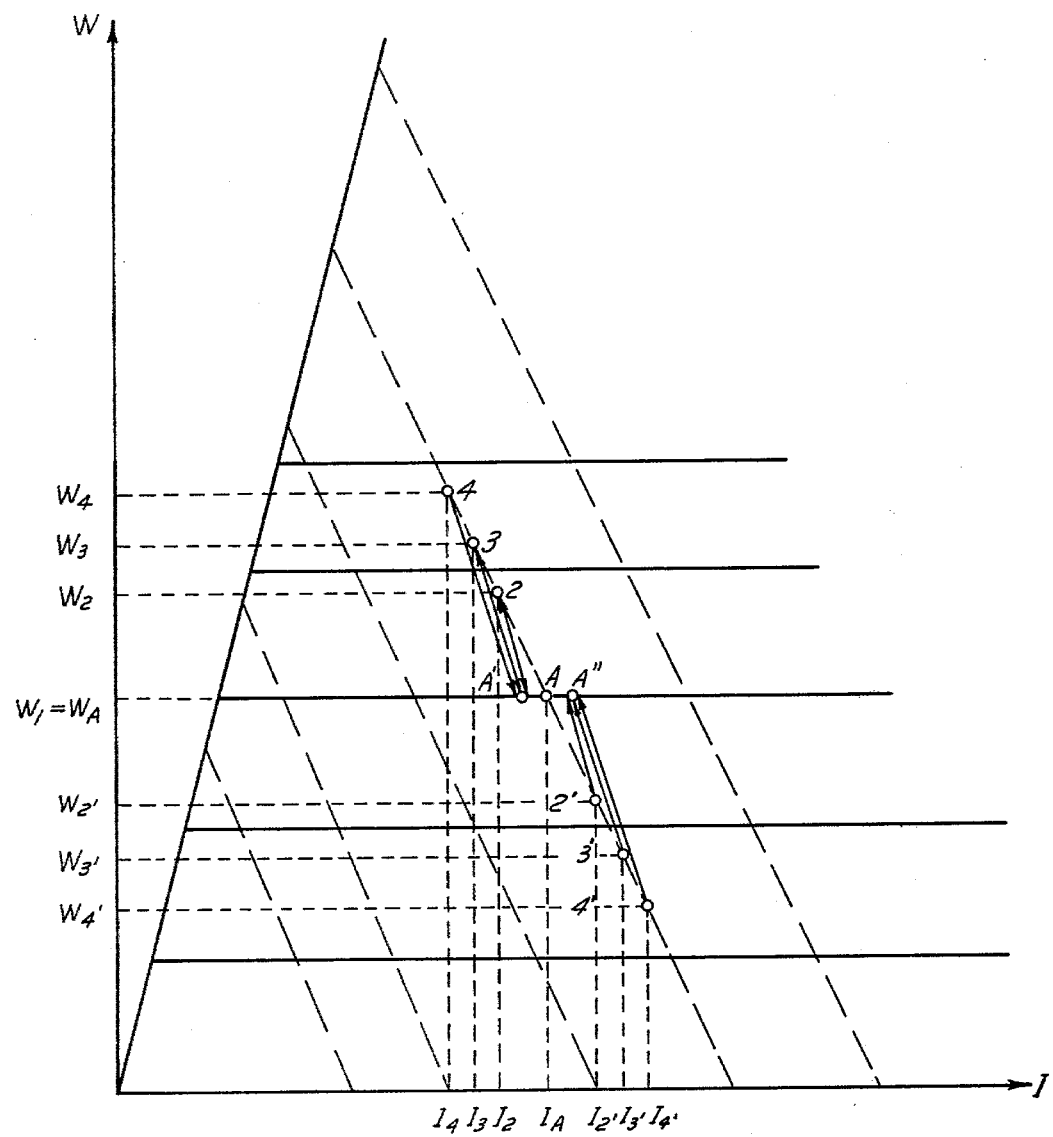
FIG. 13 is a graph similar to FIG. 12 but showing the interaction between the motors of the various modules 1, 2, 3, and 4 of the system.

In FIG. 13 the speeds of the individual modules are designated $W_1$, $W_2$, $W_3$, $W_4$. As above disclosed, the motor of module 1 has a constant speed, while the motors of modules 2, 3, 4 have variable speeds. In the operation depicted in FIG. 1, the motor of module 2 has higher speed than the motors of module 1 and module 3, while the motor of module 3 has a lower speed than the motors of modules 2 and 4. Thus the load on the motor of module 2 is less than that on the motors of modules 1 and 3, and the load on module 3 is greater than that on modules 2 and 4. Due to this, the hoses 18 and 20 contain more of the wire 8 than it is necessary and in hose 19 the wire is tensioned. In this position of the electrode wire, module 1 is unloaded and its load becomes less than that of module 2. Module 2 lessens its speed, while module 1 pulls up the excess wire out of hose 18, due to which the load on module 2 is increased. In this way the speed of module 2 becomes lower than 1 and 2, or $W_1 > W_2 < W_3$. At the same time the load on module 3 decreases and its speed increases and becomes higher than that of modules 2 and 4, relieved also by the fact that there is more than the necessary length of wire in the hose 20.

Thus in FIG. 2 we have $W_1 = $ const. $> W_2$, $W_1 > W_2 < W_3$ and $W_2 < W_3 > W_4$. In the next moment due to the tensioning of the wire between modules 1 and 2, the load on module 1 becomes greater than that of module 2, which increases its speed up to a degree greater than that of modules 1 and 3. For the same reason, the speed of module 3 grows less than that of modules 2 and 4, or there is a return to the original condition (FIG. 1). The cycle is reversibly repeatable; all modules interact according to their load and the change in loading of the pulling module 1, which has a constant speed, and toward which the system is adjusted in order to achieve an equal load upon all modules. Thus, module 1 is the leader of the whole system.

If we look for a formation of the movements of the electrode wire between the individual modules, we find that it is a motion of pumping up and pumping out, i.e., when, in a given module there is excessive wire, in the next one the wire is tensioned. This particularly resembles the movement of a snake, owing to which we can call it conditionally "snake-like" or peristaltic movement.

It is evident from the above how the proposed device achieves levelling off of the load in the individual wire feeding mechanisms 1, 2, 3, and 4, at the same time maintaining a constant speed of the first wire feeding device 1, which symbolically plays the part of a sensor of the mechanical resistance of the electrode wire in passing through the hose in relation to the second wire feeding device 2, while the second module 2 is the symbolic sensor in relation to the third, module 2, and so on. This is a decisive factor in the production of a good quality of the weld, due to the smooth operation of the pulling wire feeding device 1. The absence of speed stabilizers or real tracking systems in the second and the successive wire feeding devices 2, 3, 4, etc. leads to a steadier functioning, as otherwise there would be a complicated system of automatic regulation with complex links—a variable, mechanical link and electric feedback. The absence of speed stabilizers or tracking systems in the second device 2 and the successive devices leads to the simplification and cheapening of the control and to the improving of the general reliability of the system.

The described system permits the linking of two and more than two wire feeding devices.

Figure 7:
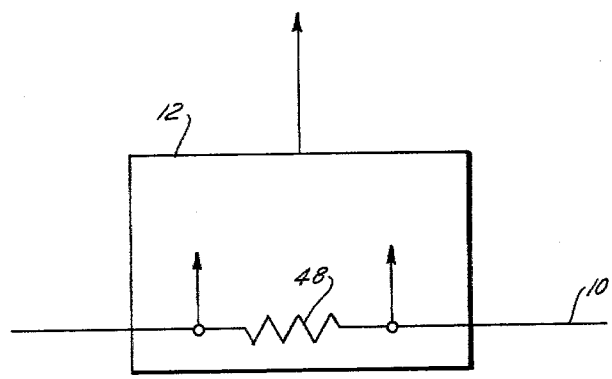
FIG. 7 is a wiring diagram of the shaper of synchronizing pulses of a resistance input.
Figure 8:
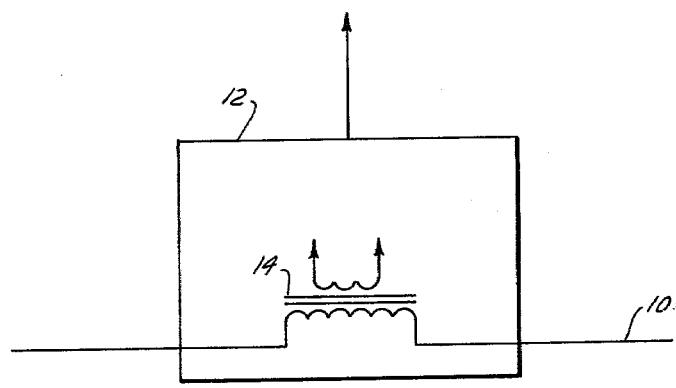
FIG. 8 is a wiring diagram of the shaper of synchronizing pulses of a transformer input.

The shapers 12 (FIG. 7) of synchronization pulses can have a resistor at their input 48, connected successively to the supply conduit 10 or 11, which shapers 12 react to the fall in the voltage in the resistor, or a current transformer 14 (FIG. 8), whose primary coil is connected successively to the supply conduit 10 or 11, which in this case will react to the induction pulse in the secondary coil.

All thyristor steps 5, 25, 26, 27, generators of ignition pulses 6, 21, 22, 23 and the speed stabilizer 7 of the first wire feeding device 1 can be located in the last wire feeding device 4, which is nearest to the spool 13 wire feeding device or in the welding power source. In such case the connection between them will be achieved according to the system as shown in FIG. 5.

The delay for additional correction takes place in the ignition pulse generator 6 of the first wire feeding device—output 17 or in the synchronization pulses shapers 12, or in any of the ignition pulse generators 21, 22, 23 of the second and successive wire feeding devices.

Figure 9:
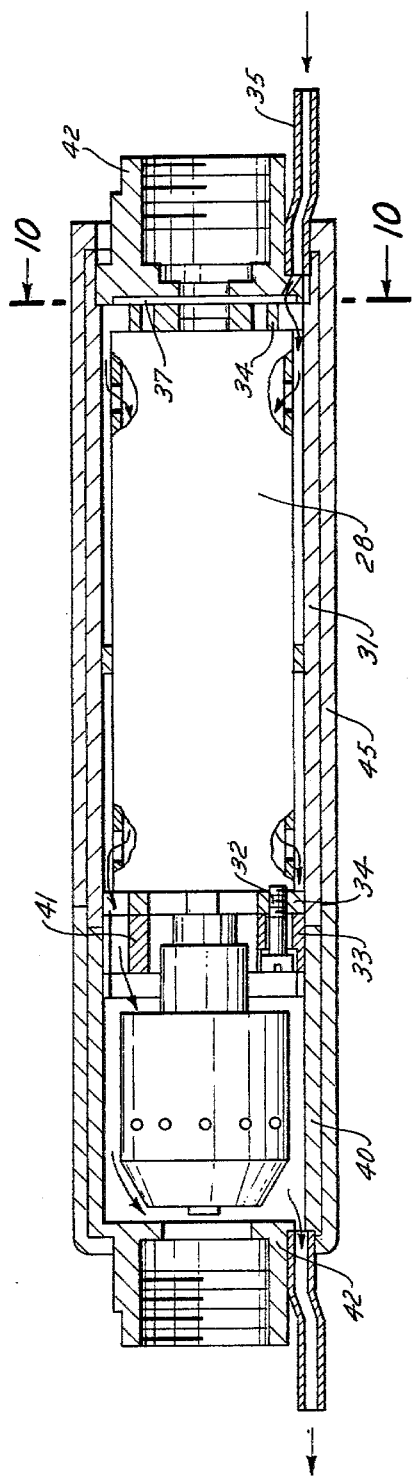
FIG. 9 is a view in longitudinal cross-section of an intermediate module.
Figure 10:
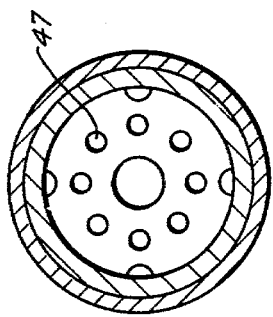
FIG. 10 is a view in cross-section taken along the line 11—11 of FIG. 10.
Figure 11:
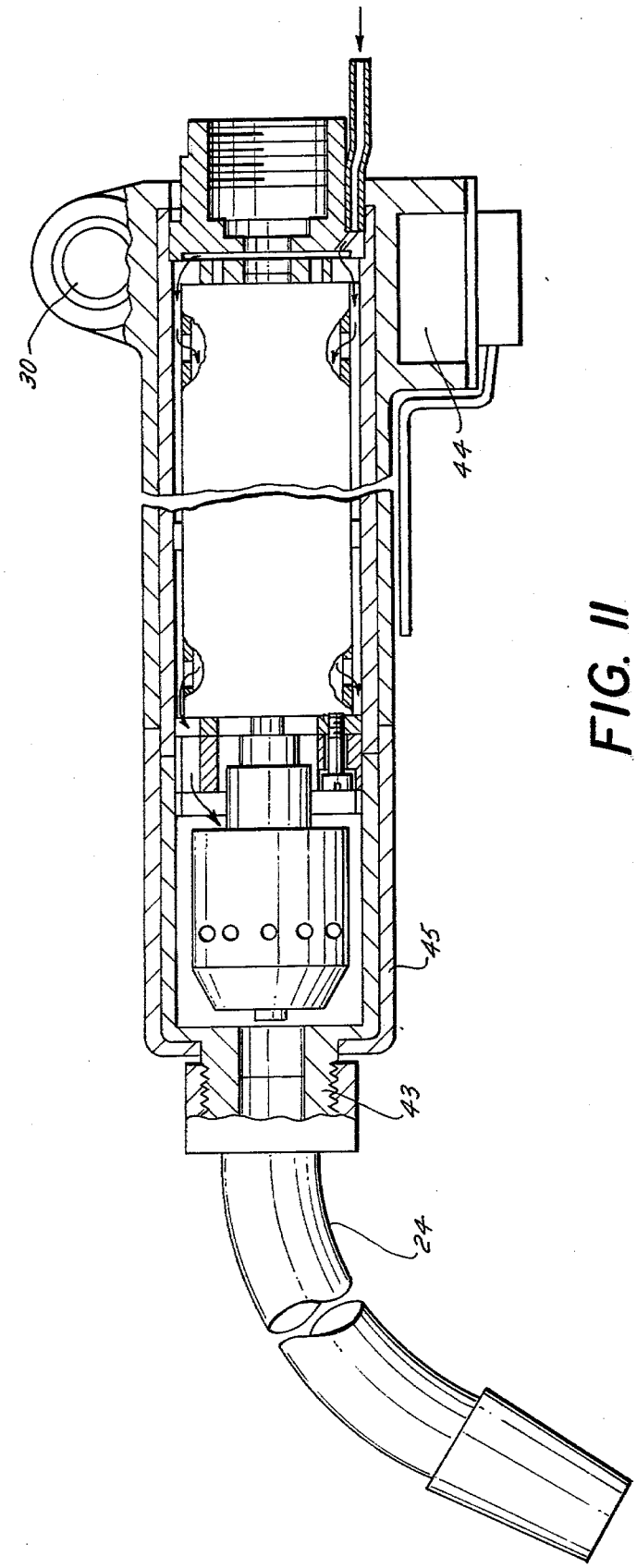
FIG. 11 is a view in longitudinal cross-section of the pulling module built into the grip of the welding device.

As shown in FIGS. 9, 10, and 11, each module of the welding device has an electric motor 28 and planetary head 29 of a certain type, mounted in the body of the module. The body of the module consists of two parts, a front one 40 and a rear one 32, connected by means of an internal threaded sleeve 41.

As the body of each module serves as a conductor of the welding current, i.e., it is current conductive and the electric motor 28 is insulated from it by means of insulation bushings 33 and washers 34. The fastening of the motor to the body of the module is achieved by means of screws 32, which pass through the insulation bushings 33 and fasten the electric motor 29 at the front to an internal sleeve 41.

The connection of the hoses 18, 19 and 20 to the modules is achieved by means of coupling sleeves 42, to which there are fastened tubes 35 for the supply of the shielding gas, such gas serving at the same time to cool the electric motors. The shielding gas passes through a space 37 and openings 47 slit through the rear insulation washer 34.

The outer surface of each module is insulated by an outer plastic coating or sleeve 45. The pulling module 1 differs in terms of construction from the rest of the modules only in its one coupling sleeve, which has an outer thread 43, to which the torch 24 is threaded. The pulling module has a switch 44 to start its operation and a potentiometer 30 to regulate the feeding speed of the electrode wire 8.

The wire feeding device according to the invention functions in the following way:

In order initially to load the device with electrode wire as well as to adjust the planetary head 29 to the respective diameter of the wire, it is necessary to unscrew the front part 40 of the module body from the sleeve 41 to secure free access to the respective planetary head. After passing the electrode wire through all of the modules of the system, the device is ready for operation.

Upon switching on the device by switch 44 and the regulation of the feeding speed by the potentiometer 30, the electrode wire begins to be pushed to the welding station. The speed of the motor of the pulling module 1, and at the same time the speed of the electrode wire 8, are synchronized as described above.

As noted above, the motor of the first, pulling module 1 is one which has "hard" characteristics, and runs at a speed which is constant from no-load to full-load conditions, whereas the motors of the subsequent, pushing modules 2, 3, and 4 have falling, "soft" characteristics. To meet such conditions, a D.C. motor is suitable for the motor of module 1, and cumulatively connected (cumulative) compound motors are suitable for the motors of modules 2, 3, and 4. The current demand of both types of motors are plotted against their speeds of rotation in FIG. 14.

It is to be noted that conceivably the motor of module 1 could also be a differentially connected compound motor, and that if modules 2, 3, and 4 were kept under load at all times during operation of the system their motors could be of the series connected type.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

We claim:

1. In an apparatus for the modular feeding of electrode wire through great distances, the apparatus having a forward, pulling module and a plurality of pushing modules disposed rearwardly of the pulling module, each module having its individual electric motor, the modules being mechanically connected by means of hollow flexible hoses through which the electrode wire travels, the rear, pushing module being in close proximity to a source of supply of the electrode wire, the forward, pulling module being disposed adjacent to a welding torch, the improvement which comprises:
    (a) the electric motor of the pulling module being of hard characteristics, while the motors of the pushing modules have soft characteristics;
    (b) means responsive to the loading of the motor of the pulling module for corresponding loading of the motors of the pushing modules by varying the speed of the pushing modules depending on the loading of the pulling module;
    (c) the speed of the motor of the pulling module being constant and independent of its own load and the load of the remaining modules, while the speed of the remaining modules is variable;
    (d) the electric motors of the pushing modules having different momentary speeds at a given time;
    (e) the electric motors of the pushing modules having electric connection with the motor of the pulling module and with each other whereby to provide synchronization of the speeds of the electric motors of the pushing modules depending upon their loads; and
    (f) the speeds of the electric motors of the pushing modules having speeds which are momentarily higher than, equal to, or less than the speed of the electric motor of the pulling module and with respect to each other, and to each module there being at least one neighboring corresponding pushing or pulling module, having a speed which is higher than or less than that of said module, whereby a snake-like motion is imparted to the electrode wire passing through the intermediate hoses.

2. An apparatus in accordance with claim 1, each of the modules has a thyristor control for its motor, the pulling module has a speed stabilizer connected to pulse generator for controlling its thyristor, each of the subsequent modules has only a pulse generator for controlling its thyristor, and conduit means connecting the pulse generator of the pulling module to the pulse generators of the subsequent modules.

3. An apparatus for modular feeding of electrode wire in accordance with claim 2, whrein the pulse generators of the subsequent, pushing modules are synchronized with the pulse generator of the pulling module by means of a synchronization conduit.

4. An apparatus for the modular feeding of electrode wire in accordance with claim 3, wherein the motors of all of the wire feeding modules operate under a regime of make-and-break current produced by the thyristor steps.

5. An apparatus for the modular feeding of electrode wire over great distances in accordance with claim 3, wherein the pulses generated in the subsequent, pushing modules drift over small intervals with relation to the time of synchronization.

6. An apparatus for the modular feeding of electrode wire over great distances, in accordance with claim 3, wherein the output of the pulse generator of the first, wire pulling device is connected by means of a synchronization conduit with the inputs of the pulse generators of the subsequent wire feeding modules.

7. An apparatus for the modular feeding of electrode wire over great distances, in accordance with claim 4, comprising shapers of the synchronization pulses generated in the pushing modules whose inputs are connected with one of the supply conduits, and wherein the inputs of the pulse generators of the subsequent, wire pushing devices are connected to the outputs of the pulse shapers.

8. An apparatus for the modular feeding of electrode wire over great distances, in accordance with claim 7, wherein the shapers of the synchronizing pulses comprise resistors connected successively with one of the supply conduits.

9. An apparatus for the modular feeding of electrode wire over great distances, in accordance with claim 7, wherein the shapers of the synchronizing pulses comprise current transformers, the inputs of the primary coils of which are connected to one of the supply conduits.

10. An apparatus for the modular feeding of electrode wire over great distances, in accordance with claim 5, wherein all of the thyristor steps, all of the generators of synchronization pulses, and the speed stabilizer of the first, pulling wire module are located in the rearward, terminal pushing module adjacent to the source of supply of the electrode wire.

11. An apparatus for the modular feeding of electrode wire over great distances, in accordance with claim 5, wherein all of the thyristor steps, all of the generators of synchronization pulses, and the speed stabilizer of the first, wire pulling module are located in a unit containing the power source of welding current.

12. An apparatus for the modular feeding of electrode wire over great distances, comprising a plurality of sequentially disposed individual wire feeding modules connected by hoses, each of the modules having an electric motor driven planetary feeding head housed within a casing of the module, and an individual electric motor having a rotor and a stator for each of the modules contained in said casing, a source of shielding gas, and means providing a continuous path for the shielding gas from the source thereof through the successive modules and the hoses between them, each of the modules, the motors therein, and the means connecting the hoses to the modules being so constructed and arranged that the shield gas passes through the modules only through the space presented between the rotor and the stator of each of the motors.

* * * * *